(12) United States Patent
Kitagawa et al.

(10) Patent No.: US 11,503,393 B2
(45) Date of Patent: Nov. 15, 2022

(54) STORAGE MEDIUM, ROAD SURFACE CONDITION ESTIMATION METHOD, AND INFORMATION PROCESSING APPARATUS

(71) Applicant: FUJITSU LIMITED, Kawasaki (JP)

(72) Inventors: Eiji Kitagawa, Akashi (JP); Isamu Watanabe, Kawasaki (JP); Hitoshi Komoriya, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 16/916,171

(22) Filed: Jun. 30, 2020

(65) Prior Publication Data

US 2021/0014592 A1 Jan. 14, 2021

(30) Foreign Application Priority Data

Jul. 10, 2019 (JP) .............................. JP2019-128758

(51) Int. Cl.
*H04R 1/08* (2006.01)
*G01M 17/02* (2006.01)
*B60C 23/04* (2006.01)

(52) U.S. Cl.
CPC ........... *H04R 1/08* (2013.01); *B60C 23/0408* (2013.01); *G01M 17/02* (2013.01); *G01M 17/021* (2013.01); *G01M 17/022* (2013.01); *G01M 17/027* (2013.01)

(58) Field of Classification Search
CPC ...... H04R 1/08; G01M 17/022; G01M 17/02; G01M 17/027; G01M 17/021; B60C 23/0408
USPC .......................................................... 73/146
See application file for complete search history.

(56) References Cited

U.S. PATENT DOCUMENTS

| 5,586,028 A | * | 12/1996 | Sekine | ..................... B60T 8/174 |
| | | | | 701/1 |
| 10,989,561 B2 | * | 4/2021 | Paturle | ............... G01C 21/3691 |
| 2013/0030680 A1 | * | 1/2013 | Friedlander | ............. E01C 23/01 |
| | | | | 702/56 |
| 2016/0244066 A1 | * | 8/2016 | Tani | ........................ G01B 7/345 |
| 2016/0245648 A1 | * | 8/2016 | Tani | ......................... G01C 7/04 |
| 2018/0218598 A1 | * | 8/2018 | Aoki | ..................... G08G 1/0112 |
| 2021/0014592 A1 | * | 1/2021 | Kitagawa | ............... G01N 29/14 |
| 2021/0304785 A1 | * | 9/2021 | Ninomiya | .............. H04R 3/005 |

FOREIGN PATENT DOCUMENTS

| EP | 3560783 A1 | * | 10/2019 | ............ B60W 40/06 |
| FR | 3015036 A1 | * | 6/2015 | ............ B60C 23/00 |
| JP | 8-138190 A | | 5/1996 | |
| JP | 2013-68986 A | | 4/2013 | |
| WO | WO-2010050300 A1 | * | 5/2010 | ............. B60T 8/172 |

* cited by examiner

*Primary Examiner* — Clayton E. LaBalle
*Assistant Examiner* — Kevin C Butler
(74) *Attorney, Agent, or Firm* — Xsensus LLP

(57) ABSTRACT

A non-transitory computer-readable storage medium storing a program that causes a computer to execute a process, the process includes acquiring first sound data collected by a first microphone and second sound data collected by a second microphone during traveling of a vehicle in which the first microphone is provided in vicinity of a front wheel and the second microphone is provided in vicinity of a rear wheel; and detecting a cavity under a road surface where the vehicle has traveled based on a difference between the acquired first sound data and the acquired second sound data.

13 Claims, 11 Drawing Sheets

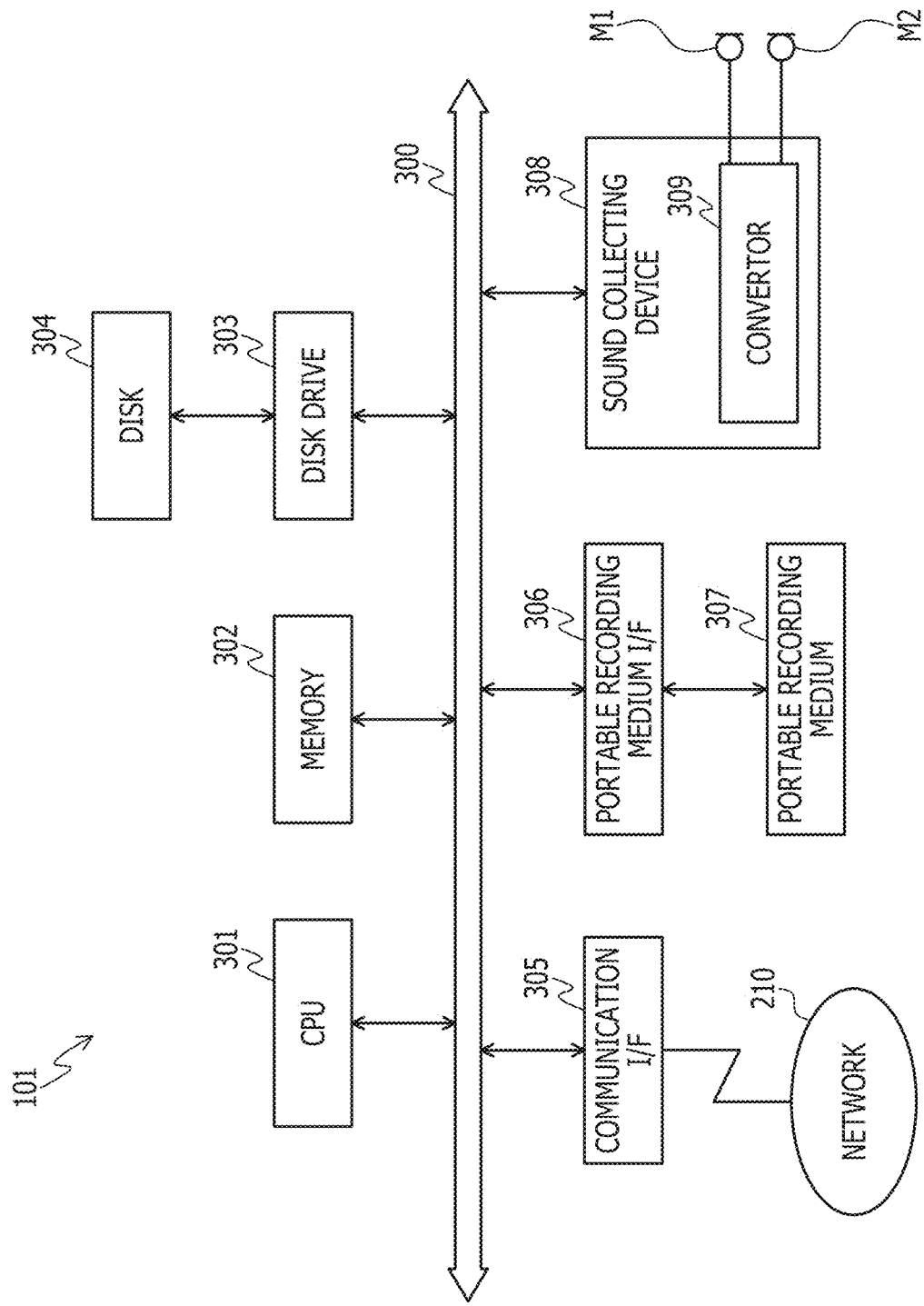

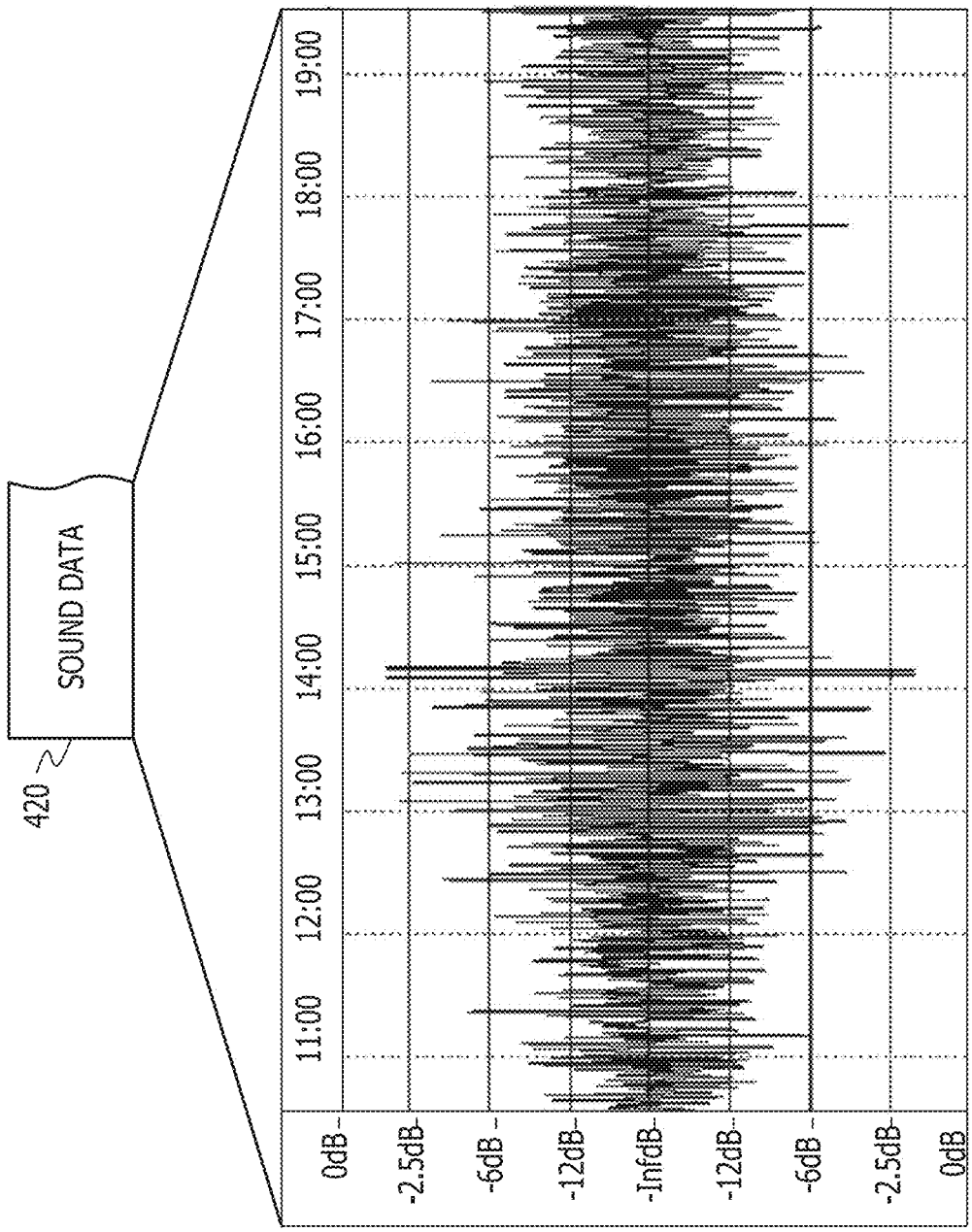

STORAGE MEDIUM, ROAD SURFACE CONDITION ESTIMATION METHOD, AND INFORMATION PROCESSING APPARATUS

CROSS-REFERENCE TO RELATED APPLICATION

This application is based upon and claims the benefit of priority of the prior Japanese Patent Application No. 2019-128758, filed on Jul. 10, 2019, the entire contents of which are incorporated herein by reference.

FIELD

The embodiments discussed herein are related to a storage medium, a road surface condition estimation method, and an information processing apparatus.

BACKGROUND

A hole called a pothole may be generated over a road surface due to deterioration or damage of asphalt pavement. A pothole becomes the cause of noise and accidents. In addition, a repair of a road takes time and is costly. Therefore, it is desirable to suppress generation of a pothole in advance.

As a related art, there is a technique of learning, in advance, a feature amount of a traveling sound for each road surface condition, collecting a traveling sound of a vehicle, extracting a feature amount from the collected traveling sound, and determining a road surface condition (for example, whether or not a wheel of the own vehicle is over a lane division line) according to the feature amount of the traveling sound extracted based on the learning data. For example, the related art is disclosed in Japanese Laid-open Patent Publication No. 2013-68986 and so on.

SUMMARY

According to an aspect of the embodiments, a non-transitory computer-readable storage medium storing a program that causes a computer to execute a process, the process includes acquiring first sound data collected by a first microphone and second sound data collected by a second microphone during traveling of a vehicle in which the first microphone is provided in vicinity of a front wheel and the second microphone is provided in vicinity of a rear wheel; and detecting a cavity under a road surface where the vehicle has traveled based on a difference between the acquired first sound data and the acquired second sound data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram illustrating a hardware configuration example of an information processing apparatus;

FIG. 4B is an explanatory diagram illustrating a specific example of sound data collected by a second microphone;

DESCRIPTION OF EMBODIMENTS

However, in the related art, it is difficult to detect a state in which a road surface is loosened before a pothole is generated, for example, a state in which the support force of the road surface has decreased due to a cavity under the road surface. For example, in a method in which a worker hits a paved surface using a hammer to inspect a deteriorated state of a road surface based on the difference in sound, there is a problem in which burden on and time for the worker to conduct the inspection work increase. When a worker performs an inspection, for example, measures such as closing a road are taken to ensure safety, resulting in a large influence on traffic.

In view of the above, it is desirable to easily detect a cavity under a road surface.

Hereinafter, with reference to the drawings, a road surface condition estimation program, a road surface condition estimation method, and an information processing apparatus according to embodiments are described in detail.

Embodiments

Figure 1:
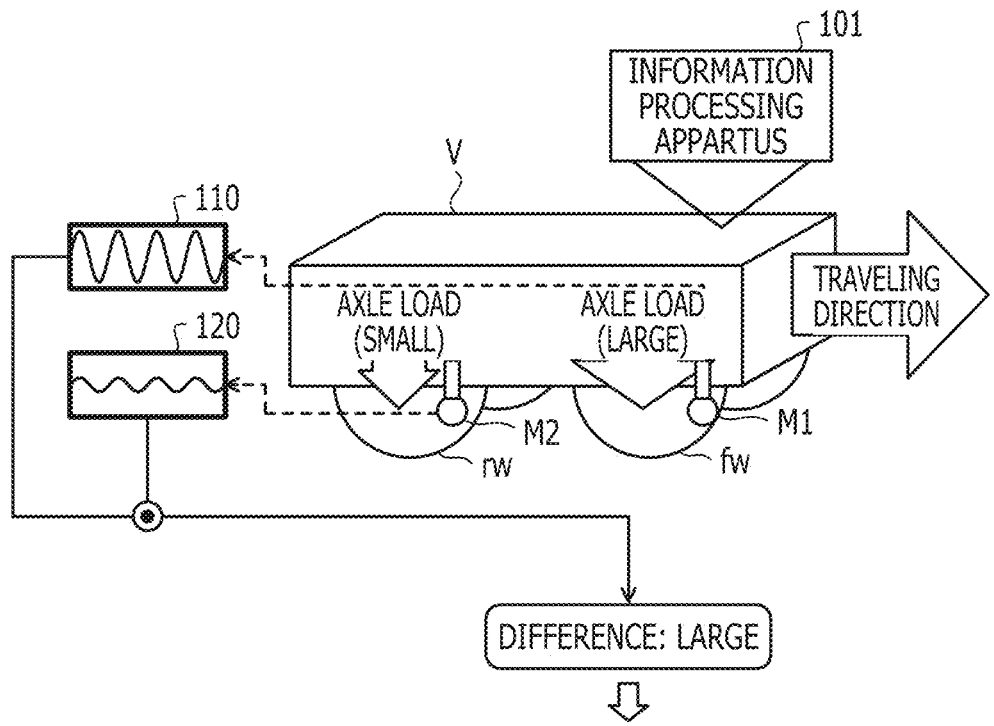
FIG. 1 is an explanatory diagram illustrating an example of a road surface condition estimation method according to an embodiment.

FIG. 1 is an explanatory diagram illustrating an example of a road surface condition estimation method according to an embodiment. In FIG. 1, an information processing apparatus 101 is a computer that detects a cavity under a road surface where a vehicle V travels. The vehicle V includes front wheels and rear wheels, and is a vehicle having front and rear axle loads different from each other. An axle load refers to a load applied to an axle by the weight of the vehicle V. For example, the vehicle V is a vehicle in which the front and rear axle loads differ by a predetermined amount or more. The vehicle V may be a four-wheeled vehicle or a two-wheeled vehicle.

In the example of FIG. 1, there is illustrated the vehicle V that includes front wheels fw and rear wheels rw, and in which a front axle load (for example, 700 kg) is heavier than the rear axle load (for example, 300 kg). The information processing apparatus 101 is installed in the vehicle V. In the vehicle V, a first microphone M1 is provided in the vicinity of the right front wheel fw, and a second microphone M2 is provided in the vicinity of the right rear wheel rw.

The vicinity of the front wheel fw refers to a position near the front wheel at which the traveling sound of the front tire is capturable. For example, the first microphone M1 is attached to a front fender, a front bumper, a side member, or the like of the vehicle V. The vicinity of the rear wheel rw refers to a position near the rear wheel at which the traveling sound of the rear tire is capturable. For example, the second microphone M2 is attached to a rear fender, a rear bumper, a rear side member, or the like of the vehicle V. When the first microphone M1 is provided in the vicinity of the left front wheel fw, the second microphone M2 is provided in the vicinity of the left rear wheel rw. For example, the first microphone M1 and the second microphone M2 are respectively provided in the vicinity of a front wheel and a rear wheel which are expected to travel on the same place of a road.

There may be cases where a cavity is generated under a pavement slab due to a pumping phenomenon that occurs by the effect of a traffic load and water permeating from a crack generated due to deterioration of the pavement over time, a joint portion of the pavement, and the like. A pumping phenomenon refers to a phenomenon in which, when a traffic load is applied, fine grain fractions of a road board blow out from under the pavement together with water (rainwater or the like) that has permeated.

If there is a cavity under the road surface (under the pavement slab), the damage on the pavement slab progresses due to the traffic load, and the crack spreads. After the crack has spread, a tire and the fractioned pavement slab closely adhere to each other during rainfall for example, and the pavement slab protrudes, resulting in generation of a hole called as a pothole.

A pothole becomes the cause of noise and accidents. In addition, a repair of a road takes time and is costly. For this reason, it is desirable to suppress the generation of a pothole by taking appropriate measures upon discovery of a cavity before the generation of the pothole, for example, at a stage when the cavity is generated under the road surface and the support force of the road surface has decreased.

In the following description, a state in which a road surface is loosened before a pothole is generated, for example, a state in which the support force of the road surface has decreased due to a cavity under the road surface may be referred to as an "indication of a pothole".

As a sound generated during the vehicle traveling (traveling sound), there is an air pumping sound. The air pumping sound is a sound generated when air compressed by friction between a tire of an automobile and a road surface is released, and changes depending on the shape of a pavement surface, the shape of the tire, and the quality of asphalt. Therefore, it may be said that, when a change in sound caused by deformation of a road surface due to the load during traveling is found, it is possible to find an indication of a pothole.

However, a road surface may be slightly deformed by the load during the vehicle traveling or may become uneven due to the deterioration of the road. Therefore, when the shape of the road surface happens to be the same as the shape at the time of an indication of a pothole, the same traveling sound is obtained, and it is not possible to distinguish whether there is an indication of a pothole or deformation of the road (a state in which there is no cavity).

Since a road surface is in a loosened state when there is a cavity under the road surface, large deformation is caused in the road by a large load and small deformation is caused in the road by a small load. For example, in the case where there is a cavity under a road surface, the difference in road surface deformation due to the difference in load is large, and the difference in sound is also large. On the other hand, in a case of deformation of a road without any cavity thereunder, due to the load bearing, the difference in road surface deformation due to the difference in load is small, and the difference in sound is also small.

Therefore, it may be said that, in order to distinguish the sound generated in a state of an indication of a pothole from the sound caused by the deformation of the road (the state in which there is no cavity), one has only to determine the difference in sound generated by the difference in the manner of deformation of the shape of the road surface due to the difference in support force when different loads are applied to the same place.

Therefore, in the present embodiment, a road surface condition estimation method will be described which enables, by utilizing the fact that the difference between sounds (traveling sounds) acquired by the microphones provided in the vicinity of the front and rear wheels of the vehicle V changes depending on the load and road surface condition, a cavity under the road surface to be easily detected. Hereinafter, a processing example of the information processing apparatus 101 is described.

(1) The information processing apparatus 101 acquires first sound data collected by the first microphone M1 and second sound data collected by the second microphone M2 when the vehicle V travels. The sound data is information indicating a temporal change in the intensity of sound. The intensity of sound is represented, for example, by decibel (dB).

In the example of FIG. 1, a case is assumed in which first sound data 110 collected by the first microphone M1 during a first period and second sound data 120 collected by the second microphone M2 during a second period are acquired. The first period may be arbitrarily set, and is, for example, a period of about one second. The second period is a period set corresponding to the first period, and is a period delayed from the first period by a predetermined time period. The predetermined time period represents a difference between the time when the front wheel fw of the vehicle V traveling straight passes through a certain place and the time when the rear wheel rw of the vehicle V traveling straight passes through the same place. Accordingly, it is possible to acquire pieces of sound data (the first sound data 110 and the second sound data 120) when the front wheel fw and the rear wheel rw of the vehicle V pass through the same place.

(2) The information processing apparatus 101 detects a cavity under the road surface where the vehicle V has traveled, based on the difference between the first sound data and the second sound data that have been acquired. When the difference between the first sound data and the second sound data is large, it may be said that the difference in road surface deformation due to the difference in load on the front and rear wheels is large. On the other hand, when the difference between the first sound data and the second sound data is small, it may be said that the difference in road surface deformation due to the difference in load between the front and rear wheels is small.

For example, when the difference between the first sound data and the second sound data is large, a cavity has been generated under the road surface, and the support force of the road surface has decreased. Therefore, it may be determined that the difference in sound is large. For this reason, the information processing apparatus 101 may detect a cavity under the road surface where the vehicle V has traveled, based on a result of comparing the difference between the first sound data and the second sound data with a predetermined threshold value. The predetermined threshold value is a threshold value for the difference between the sound data collected by the first microphone M1 and the sound data collected by the second microphone M2, and may be arbitrarily set.

For example, when the difference between the first sound data 110 and the second sound data 120 is larger than the threshold value, the information processing apparatus 101 determines that there is a cavity under the road surface where the vehicle V has traveled. On the other hand, when the difference between the first sound data 110 and the second sound data 120 is equal to or smaller than the threshold value, the information processing apparatus 101 determines that there is no cavity under the road surface where the vehicle V has traveled.

In the example of FIG. 1, a case is assumed in which the difference between the first sound data 110 and the second sound data 120 is larger than the threshold value. In this case, the information processing apparatus 101 determines that there is a cavity under the road surface where the vehicle V has traveled.

As described above, by utilizing the fact that the difference between sounds (traveling sounds) acquired by the microphones (the first microphone M1 and the second microphone M2) provided in the vicinity of the front and rear wheels of the vehicle V changes depending on the load and road surface condition, the information processing apparatus 101 may detect a cavity under the road surface where the vehicle V has traveled. As a result, a cavity under the road surface may be detected easily, as compared with a case where the road surface condition is inspected manually, for example, a case where a worker hits a paved surface by using a hammer to inspect the deteriorated state of the road surface based on the difference in sound. It is also possible to reduce an influence on traffic caused by closing of roads or the like.

(System Configuration Example of Road Surface Condition Estimation System 200)

Next, a system configuration example of a road surface condition estimation system 200 including the information processing apparatus 101 according to the embodiment will be described.

Figure 2:
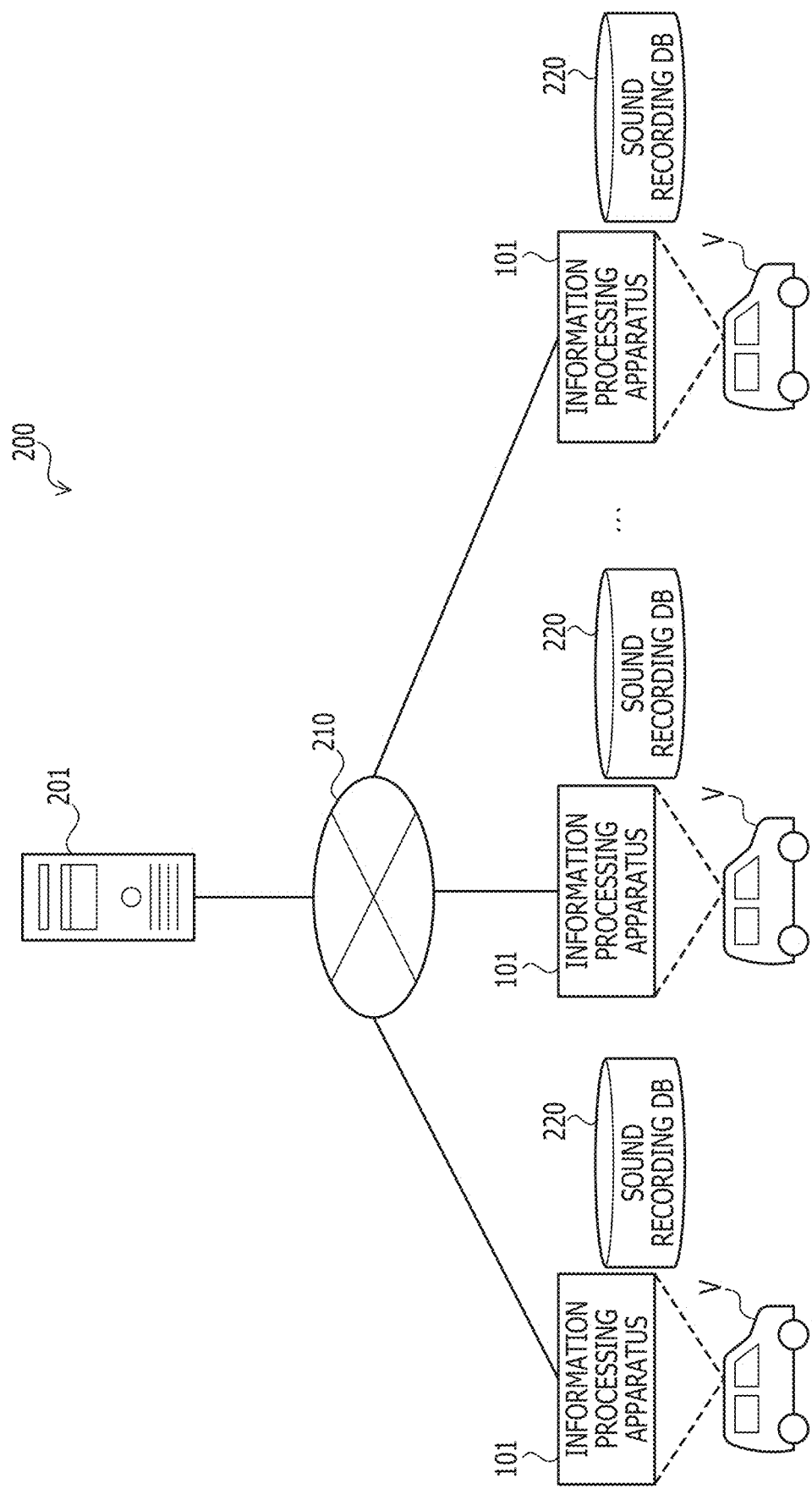
FIG. 2 is an explanatory diagram illustrating a system configuration example of a road surface condition estimation system.

FIG. 2 is an explanatory diagram illustrating a system configuration example of the road surface condition estimation system 200. In FIG. 2, the road surface condition estimation system 200 includes a plurality of information processing apparatuses 101 (three in the example of FIG. 2) and a management apparatus 201. In the road surface condition estimation system 200, the plurality of information processing apparatuses 101 and the management apparatus 201 are coupled to each other via a wired or wireless network 210. The network 210 is, for example, a local area network (LAN), a wide area network (WAN), a mobile communication network, or the Internet.

Each of the information processing apparatuses 101 includes a sound recording database (DB) 220, is installed in the vehicle V, and detects a cavity under a road surface where the vehicle V has traveled. The sound recording DB 220 records sound data collected by the first microphone M1 (for example, see FIG. 3 described later) and sound data collected by the second microphone M2 (for example, see FIG. 3 described later).

For example, the information processing apparatus 101 may be a dedicated apparatus for estimating road surface conditions, or may be realized by an in-vehicle apparatus, a smartphone, a tablet personal computer (PC), or the like.

The vehicle V may be a vehicle driven by a worker performing road inspection or patrol, or may be a vehicle driven by a general user.

The management apparatus 201 is a computer that manages information (for example, a road surface condition estimation result) uploaded from the information processing apparatus 101. For example, the management apparatus 201 may be a PC used by an administrator of the road surface condition estimation system 200, or may be a server accessible from a PC or the like used by the administrator of the road surface condition estimation system 200. The administrator of the road surface condition estimation system 200 is, for example, a person involved in maintenance of a road.

In the following description, as illustrated in FIG. 1, the front wheels of the vehicle V in which the information processing apparatus 101 is installed may be referred to as "front wheels fw", and the rear wheels may be referred to as "rear wheels rw".

(Hardware Configuration Example of Information Processing Apparatus 101)

Next, a hardware configuration example of the information processing apparatus 101 will be described.

FIG. 3 is a block diagram illustrating a hardware configuration example of the information processing apparatus 101. In FIG. 3, the information processing apparatus 101 includes a central processing unit (CPU) 301, a memory 302, a disc drive 303, a disc 304, a communication interface (I/F) 305, a portable recording medium I/F 306, a portable recording medium 307, and a sound collecting device 308. These components are coupled to one another through a bus 300.

The CPU 301 controls the entirety of the information processing apparatus 101. The CPU 301 may include multiple cores. The memory 302 includes, for example, a read-only memory (ROM), a random-access memory (RAM), a flash ROM, and the like. For example, the flash ROM stores an operating system (OS) program, the ROM stores an application program, and the RAM is used as a work area of the CPU 301. The program stored in the memory 302 is loaded by the CPU 301, thereby causing the CPU 301 to execute coded processing.

The disc drive 303 controls reading and writing of data from and to the disc 304 in accordance with the control of the CPU 301. The disc 304 stores the data written under the control of the disc drive 303. Examples of the disc 304 include a magnetic disc, an optical disc, and the like.

The communication I/F 305 is coupled to the network 210 via a communication line, and is coupled to an external computer (for example, the management apparatus 201 illustrated in FIG. 2) via the network 210. The communication I/F 305 functions as an interface between the network 210 and the inside of the apparatus, and controls input and output of data to and from the external computer.

The portable recording medium I/F 306 controls reading and writing of data from and to the portable recording medium 307 in accordance with the control of the CPU 301. The portable recording medium 307 stores the data written under the control of the portable recording medium I/F 306. Examples of the portable recording medium 307 include a compact disc read-only memory (CD-ROM), a digital versatile disk (DVD), a Universal Serial Bus (USB) memory, and the like.

The sound collecting device 308 includes the first microphone M1, the second microphone M2, and a converter 309. The first microphone M1 is a device that converts sound into an electric signal, and is provided in the vicinity of a front wheel of the vehicle V. The first microphone M1 may have, for example, directivity (high sensitivity to sound) in the direction of a front tire.

The second microphone M2 is a device that converts sound into an electric signal, and is provided in the vicinity of a rear wheel of the vehicle V. The second microphone M2 may have, for example, directivity in the direction of a rear tire. The converter 309 converts an analog signal into a digital signal. Sound collected by the first microphone M1 and sound collected by the second microphone M2 are subjected to analog-to-digital (A/D) conversion by the converter 309.

When the first microphone M1 is provided in the vicinity of the right front wheel of the vehicle V, the second microphone M2 is provided in the vicinity of the right rear wheel of the vehicle V. On the other hand, when the first microphone M1 is provided in the vicinity of the left front wheel of the vehicle V, the second microphone M2 is provided in the vicinity of the left rear wheel of the vehicle V. However, the first microphone M1 may be provided in the vicinity of each of the right front wheel and the left front wheel of the vehicle V, and the second microphone M2 may be provided in the vicinity of each of the right rear wheel and the left rear wheel of the vehicle V.

The information processing apparatus 101 may include, for example, a Global Positioning System (GPS) unit, a solid state drive (SSD), an input device, a display, and the like, in addition to the above-described components. The information processing apparatus 101 may not include, for example, the disc drive 303, the disc 304, the portable recording medium I/F 306, and the portable recording medium 307 among the components described above. The management apparatus 201 illustrated in FIG. 2 may also be realized by a hardware configuration similar to that of the information processing apparatus 101.

(Specific Example of Sound Data)

Next, specific examples of sound data collected by the first microphone M1 and the second microphone M2 will be described with reference to FIGS. 4A and 4B.

Figure 4A:
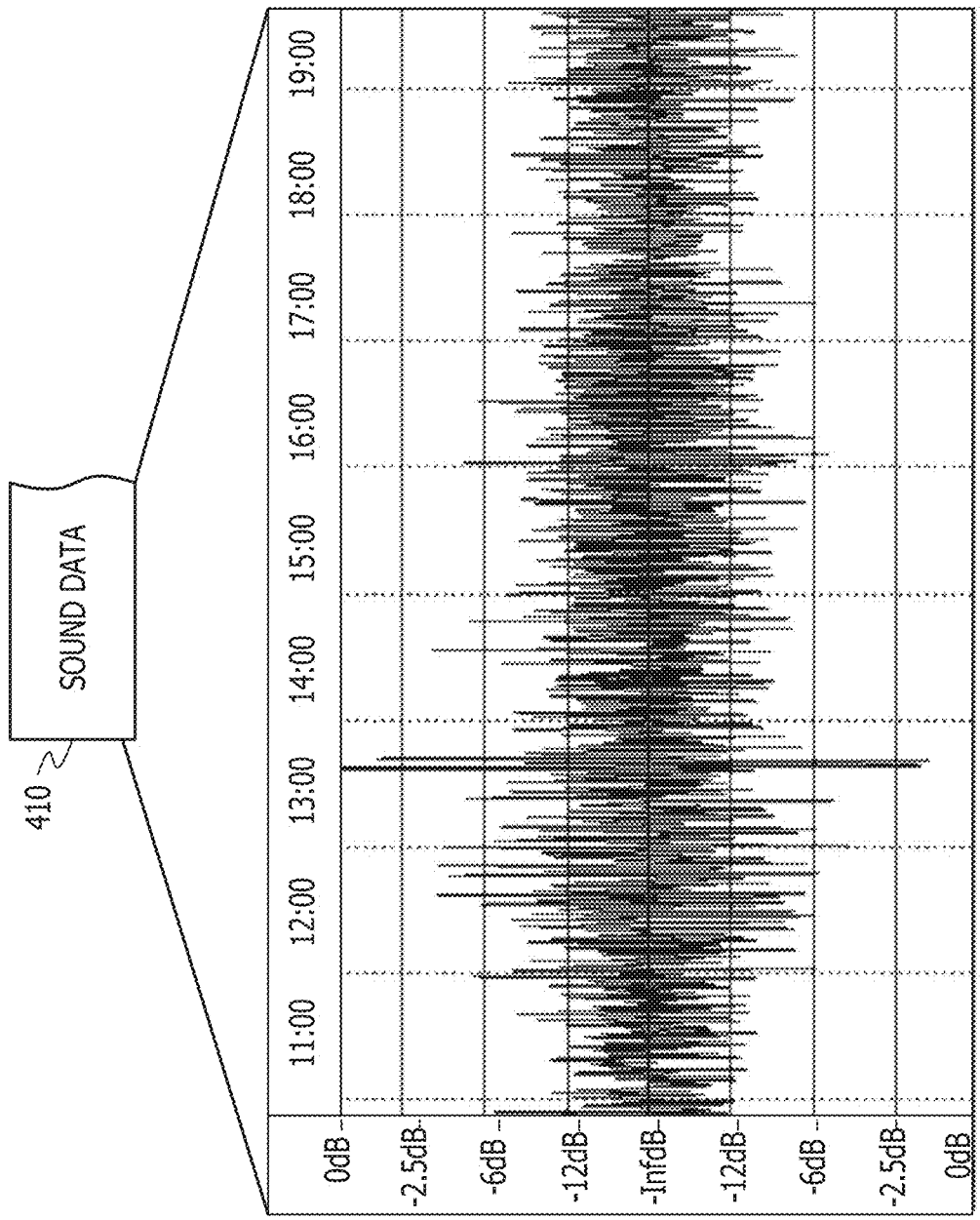
FIG. 4A is an explanatory diagram illustrating a specific example of sound data collected by a first microphone.

FIG. 4A is an explanatory diagram illustrating a specific example of sound data collected by the first microphone M1. FIG. 4B is an explanatory diagram illustrating a specific example of sound data collected by the second microphone M2. In FIG. 4A, sound data 410 is information indicating a temporal change in the intensity of sound collected by the first microphone M1 provided in the vicinity of the right front wheel (or the left front wheel) of the vehicle V.

In FIG. 4B, sound data 420 is information indicating a temporal change in the intensity of sound collected by the second microphone M2 provided in the vicinity of the right rear wheel (or the left rear wheel) of the vehicle V. In FIGS. 4A and 4B, the horizontal axis indicates the elapse of time (unit: second), and the vertical axis indicates the volume (unit: dB). In FIGS. 4A and 4B, indication of date, hours, and minutes is omitted.

(Functional Configuration Example of Information Processing Apparatus 101)

Figure 5:
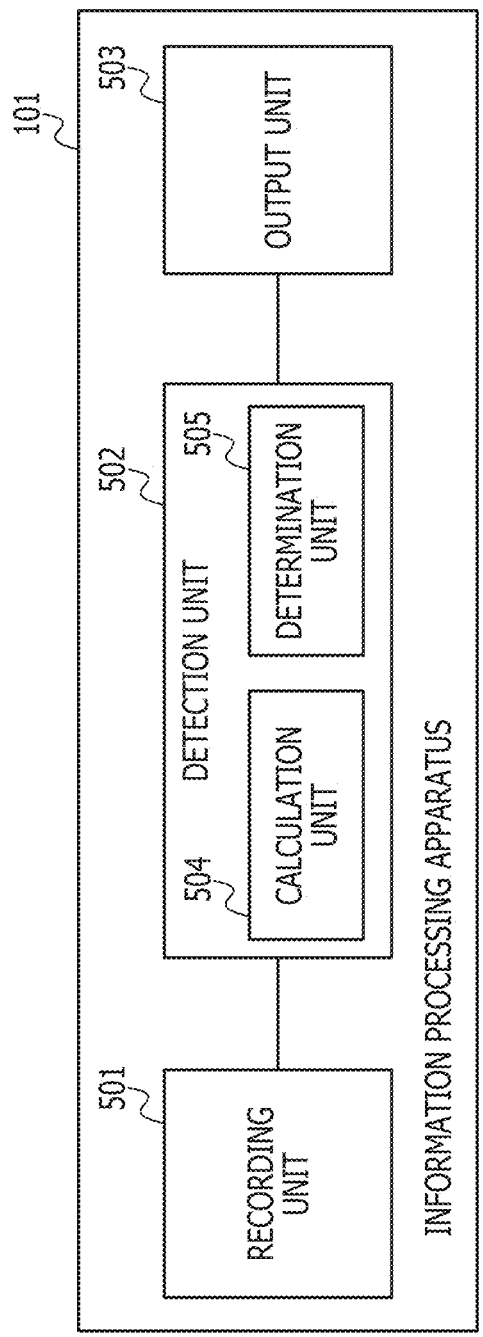
FIG. 5 is a block diagram illustrating a functional configuration example of the information processing apparatus.

FIG. 5 is a block diagram illustrating a functional configuration example of the information processing apparatus 101. In FIG. 5, the information processing apparatus 101 includes a recording unit 501, a detection unit 502, and an output unit 503. The recording unit 501, the detection unit 502, and the output unit 503 are functions constituting a control unit, and implement their functions by, for example, causing the CPU 301 to execute programs stored in storage devices such as the memory 302, the disc 304, and the portable recording medium 307 illustrated in FIG. 3 or by using the communication I/F 305. The processing result obtained by each functional unit is stored, for example, in storage devices such as the memory 302 and the disc 304.

The recording unit 501 records sound data collected by the first microphone M1 provided in the vicinity of the front wheel fw (near the front wheel) of the vehicle V. The recording unit 501 records sound data collected by the second microphone M2 provided in the vicinity of the rear wheel rw (near the rear wheel) of the vehicle V.

For example, the recording unit 501 records, in the sound recording DB 220 illustrated in FIG. 2, sound data obtained by A/D conversion of the sound collected by the first microphone M1 with the converter 309 (see FIG. 3). The recording unit 501 records, in the sound recording DB 220, sound data obtained by A/D conversion of the sound collected by the second microphone M2 with the converter 309.

The recording unit 501 may record, for example, sound data collected by the first microphone M1 and sound data collected by the second microphone M2 during traveling of the vehicle V over a road specified in advance. Accordingly, for example, sound data acquired by each of the microphones during traveling over an asphalt-paved road or a road enabling traveling straight may be recorded.

The recording unit 501 may exclude, from the recording target, sound data acquired when a predetermined steering operation is performed. The predetermined steering operation is, for example, a steering operation of a predetermined operation amount or more in the left or right direction. Accordingly, for example, sound data acquired by each of the microphones during traveling on a curved road or right/left turning may be excluded from the processing target.

The detection unit 502 detects a cavity under a road surface where the vehicle V has traveled, based on a difference S between the first sound data collected by the first microphone M1 and the second sound data collected by the second microphone M2. For example, the detection unit 502 includes a calculation unit 504 and a determination unit 505.

The calculation unit 504 calculates a passage time difference d between the passage times of the front and rear wheels of the vehicle V based on a speed v of the vehicle V. The passage time difference d represents a time difference between the passage of the front wheel fw and the passage of the rear wheel rw through a place where the front wheel fw of the vehicle V traveling straight pass through.

For example, the calculation unit 504 calculates the passage time difference d by dividing a wheel base h by the speed v of the vehicle V. The wheel base h is a distance between the front wheel axis and the rear wheel axis of the vehicle V. The wheel base h is stored, for example, in storage devices such as the memory 302 and the disc 304.

The speed v of the vehicle V may be acquired, for example, from an electronic control unit (ECU) of the vehicle V. However, the calculation unit 504 may estimate the speed v of the vehicle V from the wheel base h and the difference between a timing at which sound with a characteristic frequency appears in the first sound data and a timing at which sound with a characteristic frequency appears in the second sound data, for example.

Next, the calculation unit 504 acquires, from the sound recording DB 220, the first sound data collected by the first microphone M1 in the first period and the second sound data collected by the second microphone M2 in the second period. The first period is a period from an arbitrary time point t to a time point (t+Δt). Δt may be arbitrarily set, and is set to be a time period of, for example, about one second.

The second period is a period set corresponding to the first period, and is a period delayed from the first period by the passage time difference d. For example, the second period is a period from a time point (t+d) to a time point (t+d+Δt).

Next, the calculation unit 504 calculates the difference S between the acquired first sound data and the acquired second sound data. For example, the calculation unit 504 calculates the difference S by accumulating the difference obtained by comparing the sound volume of the first sound data and the sound volume of the second sound data with each other at a certain time interval. The certain time interval may be arbitrarily set, and is set to be a time period of, for example, about 0.1 seconds. For example, assuming that the certain time interval is 0.1 seconds, the calculation unit 504 calculates the difference S by accumulating the difference s between the sound volume of the first sound data and the sound volume of the second sound data at an interval of 0.1 seconds. Each difference s is "(the sound volume of the first sound data)−(the sound volume of the second sound data)" at a corresponding time point.

Figure 6:
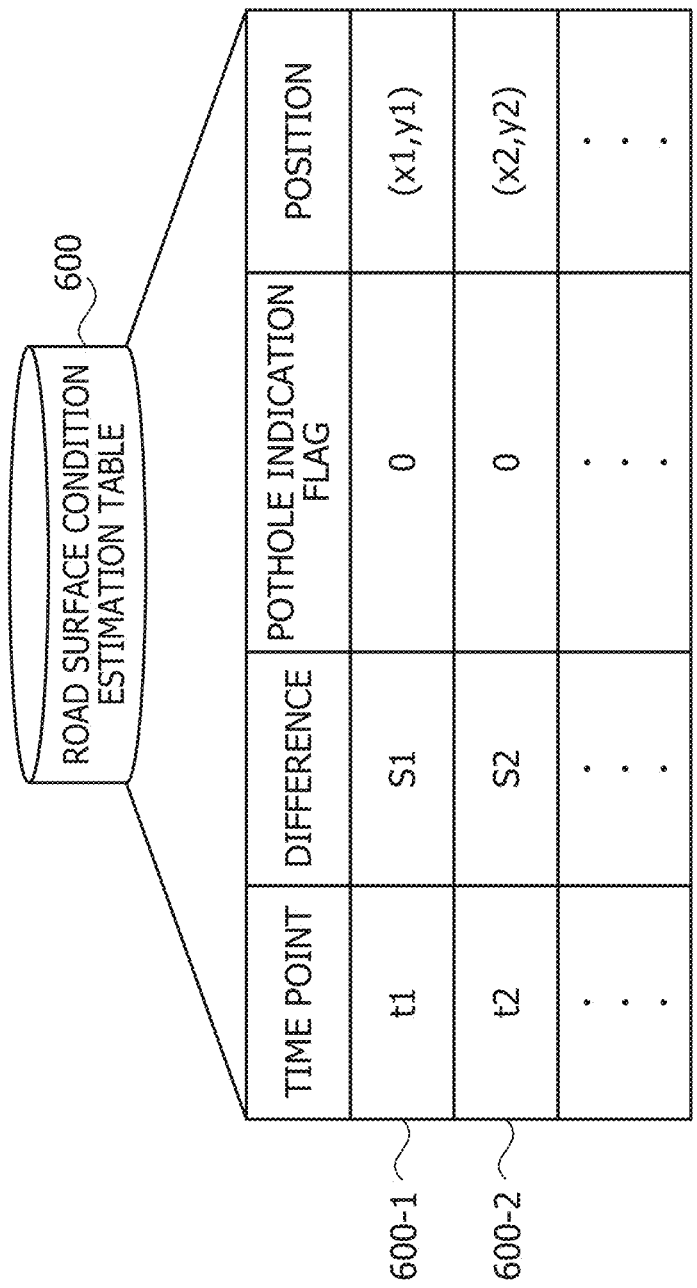
FIG. 6 is an explanatory diagram illustrating an example of contents stored in a road surface condition estimation table.

The calculated difference S is stored, for example, in a road surface condition estimation table 600 as illustrated in FIG. 6, which will be described later. The difference S corresponds to a value (similarity) indicating the degree of similarity between the first sound data and the second sound data. In the above description, the example of calculating the difference S by accumulating the difference obtained by comparing the sound volume of the first sound data and the sound volume of the second sound data with each other at a certain time interval is described by way of example. However, the way in which the different S is calculated is not limited to this. For example, for calculation of the difference S, any existing technique for calculating the similarity of waveforms such as sound data may be used.

Based on the calculated difference S between the first sound data and the second sound data, the determination unit 505 determines whether or not there is a cavity under the road surface where the vehicle V has traveled. For example, the determination unit 505 determines whether or not there is a cavity under the road surface where the vehicle V has traveled based on the result of comparison between the calculated difference S and a threshold value Th.

For example, when the difference S is larger than the threshold value Th, the determination unit 505 determines that there is a cavity under the road surface where the vehicle V has traveled. On the other hand, when the difference S is equal to or less than the threshold value Th, the determination unit 505 determines that there is no cavity under the road surface where the vehicle V has traveled. An example of detection of a cavity under the road surface where the vehicle V has traveled will be described later with reference to FIG. 7.

This makes it possible to detect a cavity under the road surface where the vehicle V has traveled, by utilizing the fact that the difference between sounds (traveling sounds) acquired by the microphones provided in the vicinity of the front and rear wheels of the vehicle V when traveling straight changes depending on the load and road surface condition.

The detection result is stored, for example, in the road surface condition estimation table 600 as illustrated in FIG. 6. The road surface condition estimation table 600 is realized by, for example, storage devices such as the memory 302 and the disc 304. Contents stored in the road surface condition estimation table 600 is described.

FIG. 6 is an explanatory diagram illustrating an example of contents stored in the road surface condition estimation table 600. In FIG. 6, the road surface condition estimation table 600 includes fields of time point, difference, pothole indication flag, and position, and by setting information in each field, stores pieces of road surface condition estimation information (for example, road surface condition estimation information 600-1 and road surface condition estimation information 600-2) as records.

The time point is a time point at which the road surface condition is estimated, and is, for example, a time point t which is the start point of the first period. The difference is the difference S between the first sound data and the second sound data. The pothole indication flag is information indicating whether or not an indication of a pothole has been detected.

When a cavity under the road surface where the vehicle V has traveled is not detected, "0" is set for the pothole indication flag. "0" of the pothole indication flag indicates that an indication of a pothole has not been detected. When a cavity under the road surface where the vehicle V has traveled is detected, "1" is set for the pothole indication flag. "1" of the pothole indication flag indicates that an indication of a pothole has been detected.

The position is coordinates (latitude, longitude) representing the position of the vehicle V at the time point t. The position of the vehicle V is specified, for example, from position information output from a GPS unit (not illustrated). The GPS unit receives radio waves from the GPS satellites and outputs position information of the vehicle V and the like. The position information of the vehicle V may be acquired from the ECU of the vehicle V.

Returning to the description of FIG. 5, the determination unit 505 may set the threshold value Th based on the difference between the past sound data collected by the first microphone M1 before the first period and the past sound data collected by the second microphone M2 before the second period.

For example, the determination unit 505 calculates an average value of the differences between the pieces of sound data collected by the first microphone M1 at the certain time interval before the first period and the pieces of sound data collected by the second microphone M2 at the certain time interval before the second period. The determination unit 505 may then set the calculated average value of the differences as the threshold value Th.

For example, the determination unit 505 refers to the road surface condition estimation table 600, and specifies pieces of road surface condition estimation information in which the time point at which the road surface condition is estimated is included within a predetermined period. The predetermined period is, for example, a most recent period of several minutes to a most recent period of several tens of minutes. The information processing apparatus 101 sets the average value of the differences S in the specified pieces of road surface condition estimation information as the threshold value Th.

Accordingly, based on the difference between the past sounds acquired by the microphones (the first microphone M1 and the second microphone M2) provided in the vicinity of the front and rear wheels, the threshold value Th may be set with the difference in sounds generated when traveling on a road having no cavity under the road surface as the reference value. Therefore, it is possible to detect a cavity under the road surface where the vehicle V has traveled while making conditions that affect the sound equal to some extent, the conditions including wear state of tires, speed, road surface material, and temperature.

The output unit 503 outputs a detection result. For example, the output unit 503 outputs the position information of the vehicle V in association with the detection result. The position information of the vehicle V is, for example, information representing the position of the vehicle V at a time point t, which is the start point of the first period (or a time point (t+d), which is the start point of the second period).

The output unit 503 may output, for example, a risk degree K corresponding to the difference S between the first sound data and the second sound data in association with the detection result. The risk degree K is an index value indicating the degree of risk of the road surface. The risk degree K may be represented by, for example, the difference S, or may be represented by a value obtained by dividing the difference S by the threshold value Th.

The output ways of the output unit 503 include, for example, storage into storage devices such as the memory 302 and the disc 304, transmission to another computer via the communication I/F 305, or display on a display (not illustrated). For example, the output unit 503 may transmit a road surface condition estimation result to the management apparatus 201 illustrated in FIG. 2 by referring to the road surface condition estimation table 600.

The road surface condition estimation result is information indicating whether or not there is a cavity under the road surface where the vehicle V has traveled. However, the output unit 503 may transmit, to the management apparatus 201, only the road surface condition estimation result obtained when it is determined that there is a cavity under the road surface where the vehicle V has traveled. A specific example of a road surface condition estimation result will be described later with reference to FIG. 8.

The detection unit 502 may convert the first sound data into a frequency to specify a peak frequency, and convert the second sound data into a frequency to specify a peak frequency. The detection unit 502 may detect a cavity under the road surface where the vehicle V has traveled based on the difference between the specified peak frequencies. For example, when the difference in peak frequency is larger than a predetermined value, the detection unit 502 determines that there is a cavity under the road surface where the vehicle V has traveled. On the other hand, when the difference in peak frequency is equal to or smaller than the predetermined value, the detection unit 502 determines that there is no cavity under the road surface where the vehicle V has traveled.

In the above description, case where the first microphone M1 is provided in the vicinity of the right front wheel (or the left front wheel) of the vehicle V, and the second microphone M2 is provided in the vicinity of the right rear wheel (or the left rear wheel) of the vehicle V has been described by way of example, the manner in which the first microphone M1 and the second microphone M2 are provided is not limited to this. For example, the first microphone M1 may be provided in the vicinity of each of the right front wheel and the left front wheel of the vehicle V, and the second microphone M2 may be provided in the vicinity of each of the right rear wheel and the left rear wheel of the vehicle V. In this case, the information processing apparatus 101 may detect, for example, a cavity under the road surface where the vehicle V has traveled by using both of the left and right wheels.

Each functional unit of the information processing apparatus 101 may be realized by another computer different from the information processing apparatus 101 in the road surface condition estimation system 200, for example, by the management apparatus 201. In this case, the management apparatus 201 acquires, from each of the information processing apparatuses 101, sound data collected by the first microphone M1 provided in the vicinity of a front wheel and sound data collected by the second microphone M2 provided in the vicinity of a rear wheel, for the corresponding vehicle V. Each functional unit of the information processing apparatus 101 may be realized by a plurality of computers in the road surface condition estimation system 200 (for example, the information processing apparatus 101 and the management apparatus 201).

(Example of Detection of Cavity under Road Surface where Vehicle V Has Traveled)

Next, an example of detection of a cavity under the road surface where the vehicle V has traveled will be described with reference to FIG. 7.

Figure 7:
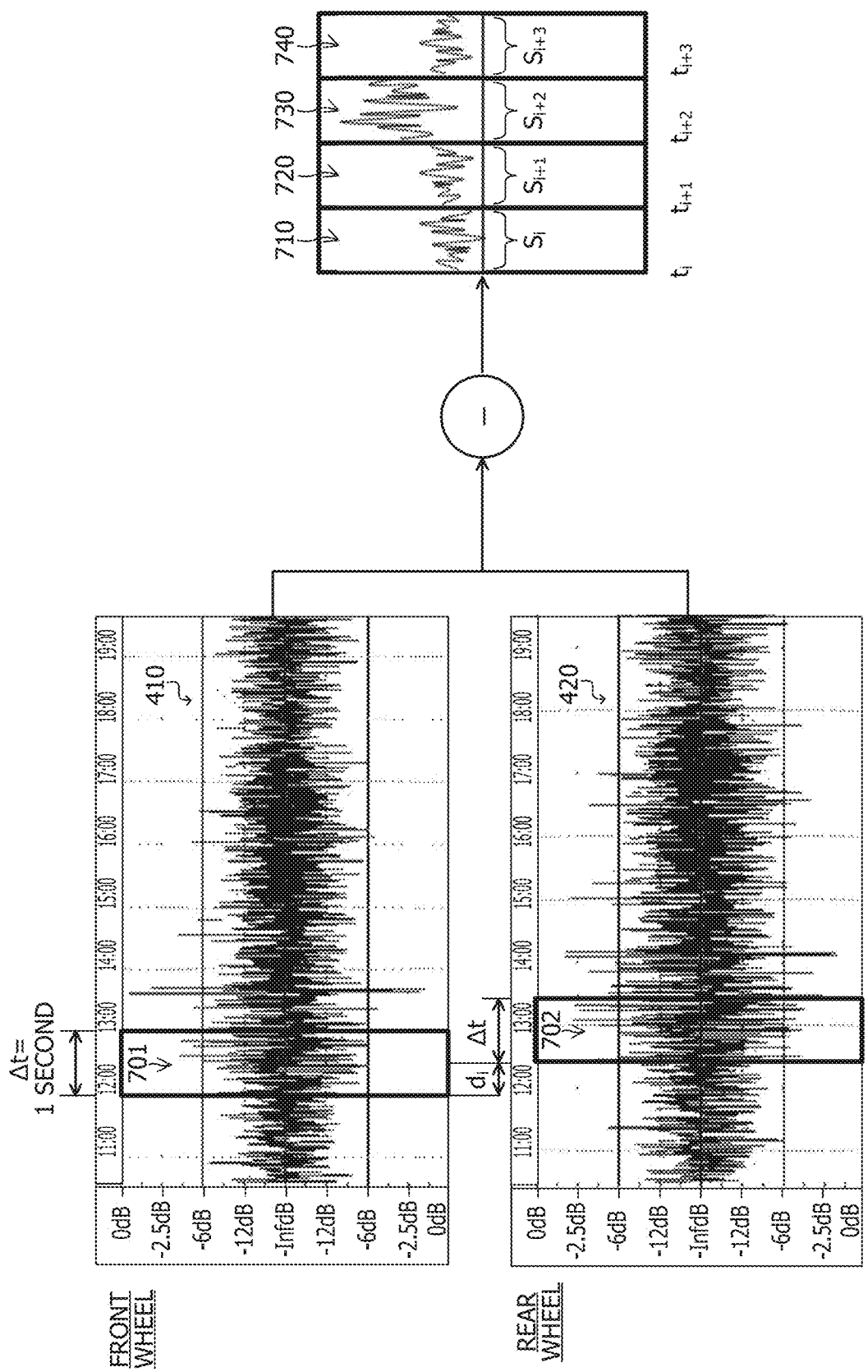
FIG. 7 is an explanatory diagram illustrating an example of detection of a cavity under a road surface where a vehicle has traveled.

FIG. 7 is an explanatory diagram illustrating an example of detection of a cavity under the road surface where the vehicle V has traveled. In FIG. 7, the sound data 410 is information indicating a temporal change in the intensity of sound collected by the first microphone M1. The sound data 420 is information indicating a temporal change in the intensity of sound collected by the second microphone M2.

The first period is defined as a period $[t_i, t_i+\Delta t]$ (i is a natural number). $\Delta t$ is defined as "$\Delta t=1$ [second]". $[t_i, t_i+\Delta t]$ represents a period from time point $t_i$ to time $(t_i+\Delta t)$.

First, the calculation unit 504 calculates a passage time difference $d_i$ between the passage times of the front and rear wheels of the vehicle V based on a speed $v_i$ of the vehicle V and the wheel base h. The speed $v_i$ is the speed of the vehicle V at the time point $t_i$. For example, the calculation unit 504 calculates the passage time difference $d_i$ by dividing the wheel base h by the speed $v_i$.

For example, the wheel base h is assumed to be "h=2 [m]", and the speed $v_i$ is assumed to be "$v_i=20$ [km/h]". In this case, the passage time difference $d_i$ is "$d_i=0.36$ [second]".

Next, the calculation unit 504 sets the second period corresponding to the first period. For example, the calculation unit 504 sets a period delayed from the first period by the passage time difference $d_i$ as the second period. For example, the second period is defined as a period $[t_i+d_i, t_i+d_i+\Delta t]$. In this case, $\Delta t$ is defined as "$\Delta t=1$ [second]".

Next, the calculation unit 504 acquires, from the sound recording DB 220, first sound data 701 collected by the first microphone M1 in the period $[t_i, t_i+\Delta t]$ and second sound data 702 collected by the second microphone M2 in the period $[t_i+d_i, t_i+d_i+\Delta t]$.

The calculation unit 504 calculates a difference $S_i$ between the acquired first sound data 701 and the acquired second sound data 702. For example, the calculation unit 504 calculates the difference $S_i$ by accumulating the difference obtained by comparing the sound volume of the first sound data 701 and the sound volume of the second sound data 702 with each other at a certain time interval (for example, 0.1 [second]).

In FIG. 7, difference data 710 indicates a temporal change of the difference obtained by comparing the sound volume of the first sound data 701 and the sound volume of the second sound data 702 at the certain time interval. A value obtained by accumulating the difference at the certain time interval indicated by the difference data 710 is the difference $S_i$. Difference data 720 indicates a temporal change of the difference obtained by comparing the sound volume of the first sound data and the sound volume of the second sound data at the time point $t_{i+1}$ at the certain time interval. A value obtained by accumulating the difference at the certain time interval indicated by the difference data 720 is the difference $S_{i+1}$.

Difference data 730 indicates a temporal change of the difference obtained by comparing the sound volume of the first sound data and the sound volume of the second sound data at the time point $t_{i+2}$ at the certain time interval. A value obtained by accumulating the difference at the certain time interval indicated by the difference data 730 is the difference $S_{i+2}$. Difference data 740 indicates a temporal change of the difference obtained by comparing the sound volume of the first sound data and the sound volume of the second sound data at the time point $t_{i+3}$ at the certain time interval. A value obtained by accumulating the difference at the certain time interval indicated by the difference data 740 is the difference $S_{i+3}$.

Based on the calculated difference $S_i$, the determination unit 505 determines whether or not there is a cavity under the road surface where the vehicle V has traveled. For example, when the difference $S_i$ is larger than the threshold value Th, the determination unit 505 determines that there is a cavity under the road surface where the vehicle V has traveled. On the other hand, when the difference $S_i$ is equal to or smaller than the threshold value Th, the determination unit 505 determines that there is no cavity under the road surface where the vehicle V has traveled.

A case is assumed in which only the difference $S_{i+2}$ is larger than the threshold value Th, among the difference $S_i$ for the time point $t_i$, the difference $S_{i+1}$ for the time point $t_{i+1}$, the difference $S_{i+2}$ for the time point $t_{i+2}$, and the difference $S_{i+3}$ for the time point $t_{i+3}$. In this case, the determination unit 505 determines, for example, that there is a cavity under the road surface where the vehicle V (the front wheel fw of the vehicle V) has traveled at the time point $t_{i+2}$. On the other hand, the determination unit 505 determines that there is no cavity under the road surface where the vehicle V (the front wheel fw of the vehicle V) has traveled at the time points $t_i$, $t_{i+1}$, and $t_{i+3}$.

(Specific Example of Road Surface Condition Estimation Result)

Next, a specific example of a road surface condition estimation result will be described with reference to FIG. 8. A road surface condition estimation result is, for example, transmitted from the information processing apparatus 101 to the management apparatus 201, and is referred to by an administrator of the road surface condition estimation system 200.

Figure 8:
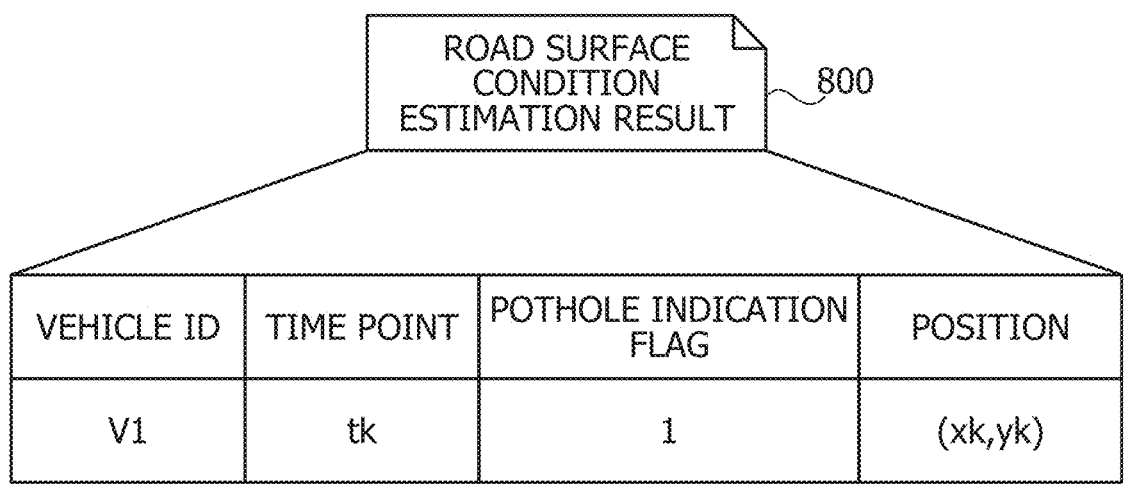
FIG. 8 is an explanatory diagram illustrating a specific example of a road surface condition estimation result.

FIG. 8 is an explanatory diagram illustrating a specific example of a road surface condition estimation result. In FIG. 8, a road surface condition estimation result 800 is information indicating whether or not there is a cavity under the road surface where the vehicle V has traveled. The road surface condition estimation result 800 includes fields of vehicle ID, time point, pothole indication flag, and position.

The vehicle ID is an identifier for uniquely identifying the vehicle V. The time point is a time point at which the road surface condition is estimated, and is, for example, a time point t which is the start point of the first period. The pothole indication flag is information indicating whether or not an indication of a pothole has been detected. The position is coordinates (latitude, longitude) representing the position of the vehicle V at the time point t.

The road surface condition estimation result 800 allows the administrator of the road surface condition estimation system 200 to recognize that there is a cavity under the road surface at a position (xk, yk) of a road where a vehicle V1 has traveled at a time point tk. This makes it possible to find a road in the state of an indication of a pothole and take measures such as repair before the pothole is generated.

The road surface condition estimation result 800 may include a risk degree K corresponding to a difference Sk. The risk degree K is an index value indicating the degree of risk of the road surface. The risk degree K is represented by the difference S, a value obtained by dividing the difference S by the threshold value Th, or the like. With the risk degree K, when the pothole indication flag is "1", the degree of severity of a road in the state of an indication of a pothole may be determined. When the pothole indication flag is "0", the degree of growth or the like of a cavity under the road surface (a cavity which may not be said to be an indication of a pothole) may be determined.

(Procedure of Road Surface Condition Estimation Processing by Information Processing Apparatus 101)

Next, a procedure of road surface condition estimation processing performed by the information processing apparatus 101 will be described. Execution of the road surface condition estimation processing by the information processing apparatus 101 begins, for example, in response to the engine of the vehicle V being started.

Figure 9:
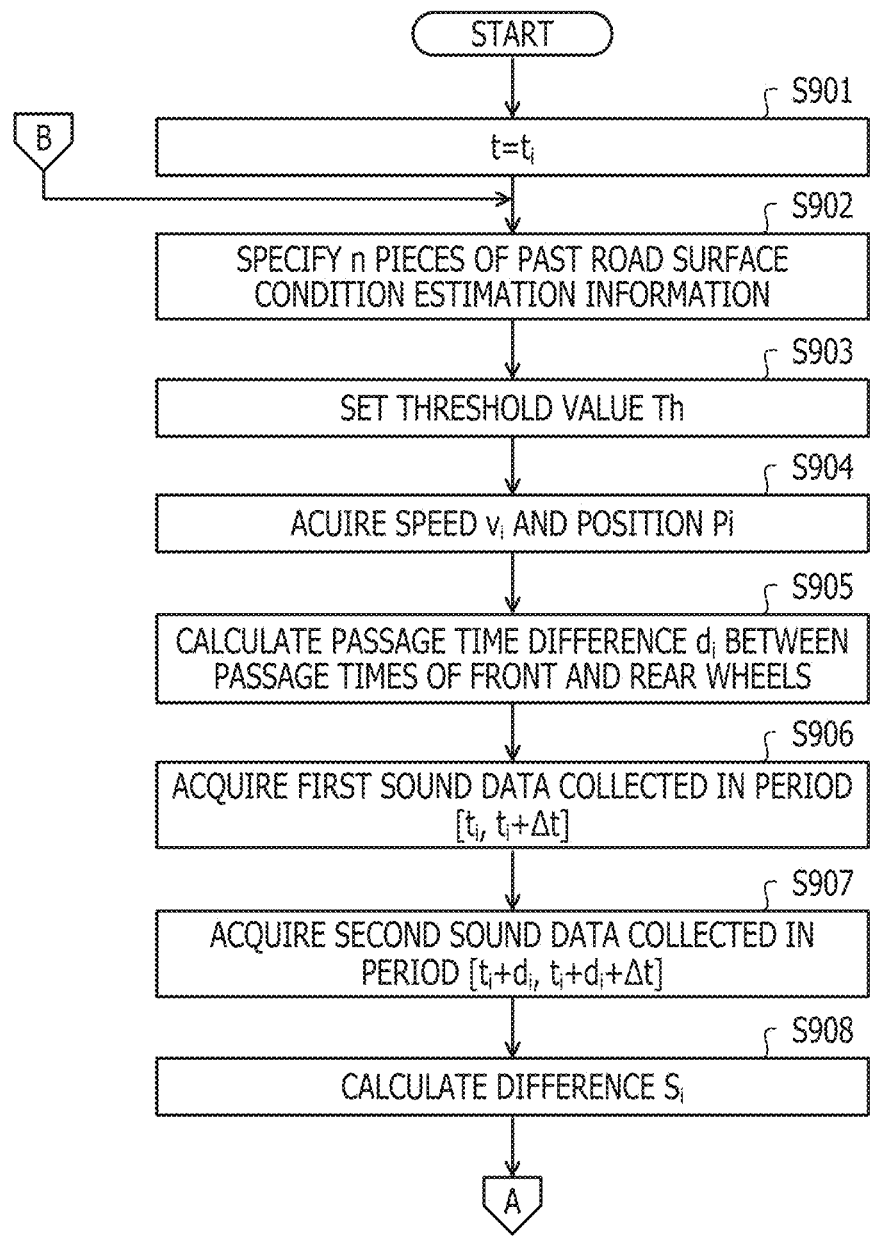
FIG. 9 is a flowchart (part 1) illustrating an example of a procedure of road surface condition estimation processing performed by the information processing apparatus.
Figure 10:
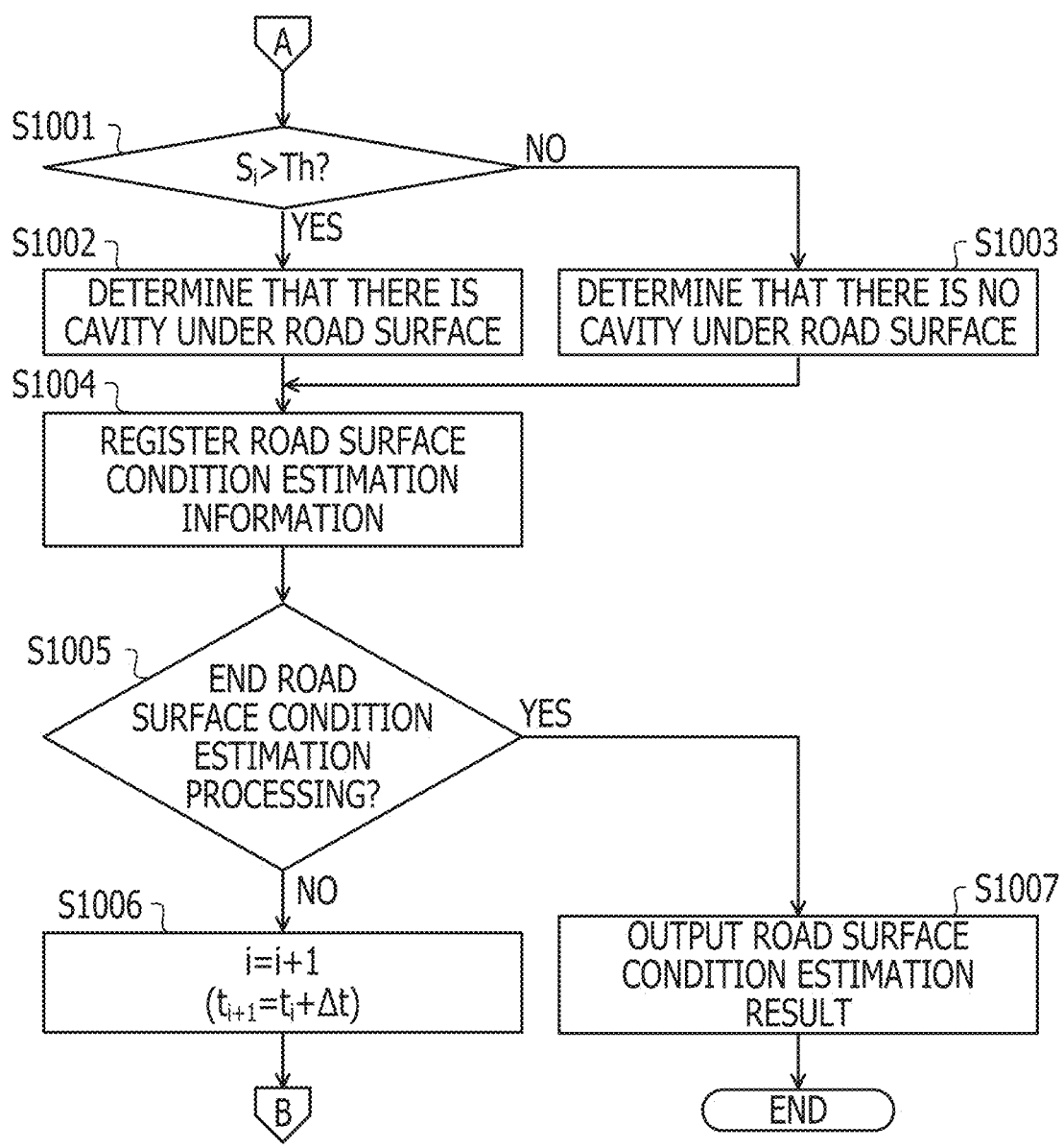
FIG. 10 is a flowchart (part 2) illustrating an example of the procedure of the road surface condition estimation processing performed by the information processing apparatus.

FIG. 9 and FIG. 10 are flowcharts illustrating an example of the procedure of road surface condition estimation processing performed by the information processing apparatus 101. In the flowchart of FIG. 9, the information processing apparatus 101 first defines the time point t as "$t=t_i$" (step S901).

Next, the information processing apparatus 101 refers to the road surface condition estimation table 600, and specifies n pieces of past road surface condition estimation information (step S902). The information processing apparatus 101 sets, as the threshold value Th, the average value of the differences S of the specified n pieces of past road surface condition estimation information (step S903).

The value of n may be arbitrarily set. For example, when "Δt=1 [second]", n is set to a value of about 600. However, there is a case in which n pieces (n latest pieces) of road surface condition estimation information are not in the road surface condition estimation table 600. In this case, the information processing apparatus 101 may set a predetermined threshold value Th, or wait until n pieces of road surface condition estimation information (excluding the pothole indication flag) are stored in the road surface condition estimation table 600.

Next, the information processing apparatus 101 acquires the speed $v_i$ and a position $P_i$ of the vehicle V at the time point $t_i$ (step S904). The speed $v_i$ is acquired, for example, from the ECU of the vehicle V. The position $P_i$ is specified, for example, from position information output from a GPS unit (not illustrated).

The information processing apparatus 101 calculates the passage time difference $d_i$ between the passage times of the front and rear wheels of the vehicle V at the time point $t_i$ based on the acquired speed $v_i$ of the vehicle V and the wheel base h of the vehicle V (step S905). Next, the information processing apparatus 101 acquires, from the sound recording DB 220, first sound data collected by the first microphone M1 in the period [$t_i$, $t_i+\Delta t$] (step S906). Δt is, for example, 1 [second].

Next, the information processing apparatus 101 acquires, from the sound recording DB 220, second sound data collected by the second microphone M2 in the period [$t_i+d_i$, $t_i+d_i+\Delta t$] (step S907). The information processing apparatus 101 calculates the difference $S_i$ between the acquired first sound data and second sound data (step S908), and the processing proceeds to step S1001 illustrated in FIG. 10.

In the flowchart of FIG. 10, the information processing apparatus 101 first determines whether or not the calculated difference $S_i$ is larger than the threshold value Th set in step S903 (step S1001). When the difference $S_i$ is larger than the threshold value Th (step S1001: Yes), the information processing apparatus 101 determines that there is a cavity under the road surface where the vehicle V has traveled (step S1002), and the processing proceeds to step S1004.

On the other hand, when the difference $S_i$ is equal to or smaller than the threshold value Th (step S1001: No), the information processing apparatus 101 determines that there is no cavity under the road surface where the vehicle V has traveled (step S1003). In accordance with the determination result, the information processing apparatus 101 registers, in the road surface condition estimation table 600, road surface condition estimation information including the time point $t_i$, the difference $S_i$, the pothole indication flag, and the position $P_i$ (step S1004).

Next, the information processing apparatus 101 determines whether or not the road surface condition estimation processing is to be ended (step S1005). The road surface condition estimation processing ends, for example, in response to the engine of the vehicle V being stopped. When the road surface condition estimation processing is not ended (step S1005: No), the information processing apparatus 101 defines i as "i=i+1" (step S1006), and the processing returns to step S902. In this case, the time point $t_{i+1}$ is defined as "$t_{i+1}=t_i+\Delta t$".

On the other hand, when the road surface condition estimation processing is to be ended (step S1005: Yes), the information processing apparatus 101 refers to the road surface condition estimation table 600 and outputs the road surface condition estimation result (step S1007), and ends the series of processing illustrated in the flowcharts.

Accordingly, it is possible to determine, from the difference S between the first sound data collected by the first microphone M1 (front wheel) and the second sound data collected by the second microphone M2 (rear wheel) when the vehicle V is traveling, whether or not there is a cavity under the road surface where the vehicle V has traveled.

As described above, during the traveling of the vehicle V in which the first microphone M1 is provided in the vicinity of the front wheel fw and the second microphone M2 is provided in the vicinity of the rear wheel rw, the information processing apparatus 101 according to the embodiment may acquire the first sound data collected by the first microphone M1 and the second sound data collected by the second microphone M2. The information processing apparatus 101 may detect a cavity under the road surface where the vehicle V has traveled based on the difference S between the acquired first sound data and second sound data. However, the vehicle V is a vehicle having front and rear axle loads different from each other.

Accordingly, by utilizing the fact that the difference between sounds (traveling sounds) acquired by the microphones (the first microphone M1 and the second microphone M2) provided in the vicinity of the front and rear wheels of the vehicle V when the vehicle V is traveling straight changes depending on the load and road surface condition, it is possible to detect a cavity under the road surface where the vehicle V has traveled.

The information processing apparatus 101 may calculate the passage time difference d between the passage times of the front and rear wheels of the vehicle V based on the speed v of the vehicle V. The information processing apparatus 101 may acquire the first sound data collected by the first microphone M1 in the first period and the second sound data collected by the second microphone M2 in the second period delayed from the first period by the passage time difference d.

Accordingly, it is possible to acquire and compare pieces of sound data (the first sound data and the second sound data) when the front wheel fw and the rear wheel rw of the vehicle V pass through the same place.

The information processing apparatus 101 may set the threshold value Th based on the past sound data collected by the first microphone M1 before the first period and the past sound data collected by the second microphone M2 before the second period. The threshold value Th is a threshold value relating to the difference between the sound data collected by the first microphone M1 and the sound data collected by the second microphone M2. For example, the information processing apparatus 101 calculates an average value of the differences between the pieces of sound data collected by the first microphone M1 at a certain time interval before the first period and the pieces of sound data collected by the second microphone M2 at the certain time interval before the second period, and sets the calculated average value as the threshold value Th.

Accordingly, by utilizing the fact that there are more places where there is no cavity under a road surface than places where is a cavity under a road surface (indication of a pothole), based on the difference between sounds acquired in the past by the microphones provided in the vicinity of the front and rear wheels, the threshold value Th may be set, with the difference in sounds generated when a vehicle travels on a road having no cavity under the road surface as the reference value.

The information processing apparatus 101 may detect a cavity under the road surface where the vehicle V has traveled based on the result of comparison between the set threshold value Th and the difference S between the first sound data and the second sound data. For example, when the difference S is larger than the threshold value Th, the information processing apparatus 101 determines that there is a cavity under the road surface where the vehicle V has traveled. When the difference S is equal to or smaller than the threshold value Th, the information processing apparatus 101 determines that there is no cavity under the road surface where the vehicle V has traveled.

Accordingly, it is possible to detect a cavity under the road surface where the vehicle V has traveled while making conditions that affect the sound equal to some extent, the conditions including the wear state of tires, speed, road surface material, and temperature. For example, since the detection is performed using the threshold value Th set based on the actually measured value of the difference in sound, it is possible to detect a cavity under the road surface by absorbing the difference in the wear state of front and rear tires and other conditions. By using the difference in sound obtained within a period of the most recent several minutes as the actually measured value, it is possible to cope with a sudden change in weather.

The information processing apparatus 101 may output a detection result.

This makes it possible to notify the administrator or the like of the road surface condition estimation system 200 of the presence or absence of an indication of a pothole, which is the state in which the support force of the road surface has decreased due to a cavity under the road surface.

The information processing apparatus 101 may output position information of the vehicle V in association with the detection result.

This makes it possible to find at an early stage a place where an indication of a pothole, which is the state in which the support force of the road surface has decreased due to a cavity under the road surface, appears.

The information processing apparatus 101 may output the risk degree K corresponding to the difference S between the first sound data and the second sound data in association with the detection result.

This makes it possible to provide the administrator or the like of the road surface condition estimation system 200 with an index value that enables the degree of risk of the road surface to be determined, together with the information indicating the presence or absence of an indication of a pothole.

Consequently, the information processing apparatus 101 according to the embodiment may easily detect a cavity under a road surface with high accuracy. This makes it possible to find a road in the state of an indication of a pothole, and it is possible to take measures such as repair of the road before a pothole, which causes noise or an accident, is generated.

It is also possible to reduce the time and cost for repairing the road, as compared with a case of taking measures after the generation of a pothole. Since sound is used to detect a cavity under a road surface, the road surface condition estimation method may be used both in the daytime and in the nighttime. Since the spring structure of the vehicle V does not have much influence on the estimation, the road surface condition estimation method may be realized without taking into consideration the characteristics of each vehicle V.

The road surface condition estimation method described in the embodiment may be implemented by executing a program prepared in advance on a computer such as a personal computer or a workstation. The road surface condition estimation program is recorded on a computer-readable recording medium such as a hard disk, a flexible disk, a CD-ROM, a DVD, or a USB memory and is executed as a result of being read from the recording medium by a computer. The road surface condition estimation program may be distributed via a network such as the Internet.

The information processing apparatus 101 described in the embodiment may also be realized by an integrated circuit (IC) for a specific application, such as a standard cell or a structured application-specific integrated circuit (ASIC), or by a programmable logic device (PLD), such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   acquiring first sound data collected by a first microphone and second sound data collected by a second microphone during traveling of a vehicle in which the first microphone is provided in vicinity of a front wheel and detects sound adjacent the front wheel and the second microphone is provided in vicinity of a rear wheel and detects sound adjacent the rear wheel; and
   detecting a cavity under a road surface where the vehicle has traveled based on a difference between the acquired first sound data and the acquired second sound data.

2. The non-transitory computer-readable storage medium according to claim 1, further comprising
   calculating a passage time difference between passage times of front and rear wheels of the vehicle based on a speed of the vehicle,
   wherein the acquiring includes acquiring the first sound data collected by the first microphone in a first period and the second sound data collected by the second microphone in a second period delayed from the first period by the passage time difference.

3. The non-transitory computer-readable storage medium according to claim 2, further comprising
   setting a threshold value for a difference between sound data collected by the first microphone and sound data collected by the second microphone, based on past sound data collected by the first microphone before the first period and past sound data collected by the second microphone before the second period, and
   wherein the detecting includes detecting a cavity under a road surface where the vehicle has traveled based on a result obtained by comparing the difference between the first sound data and the second sound data with the set threshold value.

4. The non-transitory computer-readable: storage medium according to claim 1,
   wherein the vehicle is a vehicle that has front and rear axle loads different from each other.

5. The non-transitory computer-readable storage medium according to claim 1, further comprising
   outputting a result obtained in the detecting.

6. The non-transitory computer-readable: storage medium according to claim 5,
   wherein the outputting includes outputting position information of the vehicle in association with the result obtained in the detecting.

7. A road surface condition estimation method executed by a computer, the road surface condition estimation method comprising:
   acquiring first sound data collected by a first microphone and second sound data collected by a second microphone during traveling of a vehicle in which the first microphone is provided in vicinity of a front wheel and detects sound adjacent the front wheel and the second microphone is provided in vicinity of a rear wheel and detects sound adjacent the rear wheel; and
   detecting a cavity under a road surface where the vehicle has traveled based on a difference between the acquired first sound data and the acquired second sound data.

8. An information processing apparatus, comprising:
   a memory; and
   a processor coupled to the memory and configured to:
   acquire first sound data collected by a first microphone and second sound data collected by a second microphone during traveling of a vehicle in which the first microphone is provided in vicinity of a front wheel and detects sound adjacent the front wheel and the second microphone is provided in vicinity of a rear wheel and detects sound adjacent the rear wheel, and detect a cavity under a road surface where the vehicle has traveled based on a difference between the acquired first sound data and the acquired second sound data.

9. The information processing apparatus, according to claim 8, wherein the processor is configured to:

calculate a passage time difference between passage times of front and rear wheels of the vehicle based on a speed of the vehicle, and acquire the first sound data collected by the first microphone in a first period and the second sound data collected by the second microphone in a second period delayed from the first period by the passage time difference.

10. The information processing apparatus, according to claim 9, wherein the processor is configured to:

set a threshold value for a difference between sound data collected by the first microphone and sound data collected by the second microphone, based on past sound data collected by the first microphone before and past sound data collected by the second microphone before the second period, and detect a cavity under a road surface where the vehicle has traveled based on a result obtained by comparing the difference between the first sound data and the second sound data with the set threshold value.

11. The information processing apparatus, according to claim 8, wherein the vehicle is a vehicle that has front and rear axle loads different from each other.

12. The information processing apparatus, according to claim 8, wherein the processor is configured to output a result obtained in the detecting.

13. The information processing apparatus, according to claim 8, wherein the processor is configured to output position information of the vehicle in association with the result obtained in the detecting.

* * * * *